US012812490B2

(12) United States Patent
Smith et al.

(10) Patent No.: US 12,812,490 B2
(45) Date of Patent: Nov. 24, 2026

(54) WIRELESS LOCAL AREA NETWORK (WLAN) NETWORK ID (NID) FOR ENHANCED MOBILITY SUPPORT

(71) Applicant: Cisco Technology, Inc., San Jose, CA (US)

(72) Inventors: Malcolm M. Smith, Richardson, TX (US); Pooya Monajemi, San Jose, CA (US); Brian D. Hart, Sunnyvale, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 18/193,410

(22) Filed: Mar. 30, 2023

(65) Prior Publication Data

US 2024/0334288 A1 Oct. 3, 2024

(51) Int. Cl.

| | |
|---|---|
| ***H04W 4/00*** | (2018.01) |
| ***H04W 8/02*** | (2009.01) |
| ***H04W 36/08*** | (2009.01) |
| ***H04W 36/18*** | (2009.01) |
| ***H04W 48/16*** | (2009.01) |
| *H04W 84/12* | (2009.01) |

(52) U.S. Cl.

CPC ........... *H04W 36/185* (2023.05); *H04W 8/02* (2013.01); *H04W 36/08* (2013.01); *H04W 48/16* (2013.01); *H04W 84/12* (2013.01)

(58) Field of Classification Search

CPC ..... H04W 36/185; H04W 36/08; H04W 8/02; H04W 48/16

USPC .......................................................... 370/331

See application file for complete search history.

(56) References Cited

U.S. PATENT DOCUMENTS

| | | | | |
|---|---|---|---|---|
| 10,893,554 | B1 * | 1/2021 | Gandhi | H04W 8/02 |
| 2006/0203850 | A1 | 9/2006 | Johnson et al. | |
| 2011/0158208 | A1 * | 6/2011 | Solanki | H04L 12/185 370/338 |
| 2017/0245201 | A1 | 8/2017 | Ong et al. | |
| 2017/0311249 | A1 * | 10/2017 | Lopes | H04W 36/302 |
| 2020/0120711 | A1 | 4/2020 | Sevin et al. | |

(Continued)

FOREIGN PATENT DOCUMENTS

| | | | |
|---|---|---|---|
| JP | 2010050898 | A | 3/2010 |
| KR | 20150119798 | A | 10/2015 |

OTHER PUBLICATIONS

International Search Report and Written Opinion for International Application No. PCT/US2024/019208, mailed Jun. 17, 2024, 15 Pages.

(Continued)

*Primary Examiner* — Temica M Beamer

(74) *Attorney, Agent, or Firm* — Patterson + Sheridan, LLP

(57) ABSTRACT

Techniques for improved mobility support in wireless networks are provided. A first beacon from a first wireless AP is received, where the first beacon comprises a network identifier (NID) and a service set identifier (SSID). A client device associates to the first wireless AP. Based on the NID, a set of services supported by the first wireless AP are determined. A second beacon is received from a second wireless AP, where the second beacon comprises the first NID, and the client device associates to the second wireless AP based on determining, based on the NID, that the second wireless AP supports the set of services.

20 Claims, 7 Drawing Sheets

(56) References Cited

U.S. PATENT DOCUMENTS

| | | | | |
|---|---|---|---|---|
| 2020/0145841 | A1 | 5/2020 | Bhartia et al. | |
| 2020/0213270 | A1* | 7/2020 | Wentink | H04L 61/5046 |
| 2020/0366481 | A1 | 11/2020 | Pakkan et al. | |
| 2021/0058748 | A1 | 2/2021 | Liao | |
| 2021/0058988 | A1 | 2/2021 | Gandhi et al. | |
| 2022/0191714 | A1* | 6/2022 | Vuggrala | H04W 48/20 |

OTHER PUBLICATIONS

IEEE Standards Association, "IEEE Standard for Information Technology—Telecommunications and Information Exchange between Systems Local and Metropolitan Area Networks—Specific Requirements. Part 11: Wireless LAN Medium Access Control (MAC) and Physical Layer (PHY) Specifications," IEEE Std 802.11-2020 (Revision of IEEE Std 802.11-2026), Feb. 26, 2021, 4379 pages.

* cited by examiner

WIRELESS LOCAL AREA NETWORK (WLAN) NETWORK ID (NID) FOR ENHANCED MOBILITY SUPPORT

TECHNICAL FIELD

Embodiments presented in this disclosure generally relate to wireless networking. More specifically, embodiments disclosed herein relate to use of WLAN NIDs to enhance mobility support.

BACKGROUND

In some WLAN specifications (e.g., the original Wi-Fi specification), the concept of a Basic Service Set (BSS) is used to identify an individual radio link (e.g., to an access point (AP) or soft AP, or a peer-to-peer (P2P) STA with similar channel and security parameters), whereas an Extended Service Set (ESS) was intended to define a set of links (potentially on different channels and with distinct security parameters). Generally, this set was intended to form a larger coverage area and allow roaming. The service set identifier (SSID) is often referred to as the name of the WLAN, and is generally used to identify or indicate the authentication methods used for the WLAN. That is, client devices use the advertised SSID to determine which credential set(s) and/or authentication methods to use when associating to the WLAN.

In practice, the concept of the ESS has been significantly limited at least in part because the identifier used to identify the ESS is the SSID itself. That is, there is no mechanism to identify an ESS, other than by indicating the SSID itself, which eliminates practical use of the discrete ESS concept because there is no distinction between the two. That is, SSIDs have become synonymous with a virtual AP (VAP), each with different properties (e.g., voice, Internet of Things (IOT), data SSIDs with different security/key regimes, and the like), and are also used for marketing/branding (not strictly networking) purposes. Therefore, as the mechanism available to identify an ESS is the SSID itself, the concept of a separate ESS has significantly reduced or entirely eliminated value, and clients must still make association decisions based effectively or solely on the SSID (e.g., based on authentication technique).

Some additional concepts have been proposed, including homogenous extended service set identifiers (HESSIDs) (which effectively mirror SSIDs), mobility domain information elements (MDIEs) (used to streamline re-association), and the like. However, these approaches fail to adequately enable broader understanding of the WLAN, beyond conventional SSID broadcasts.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
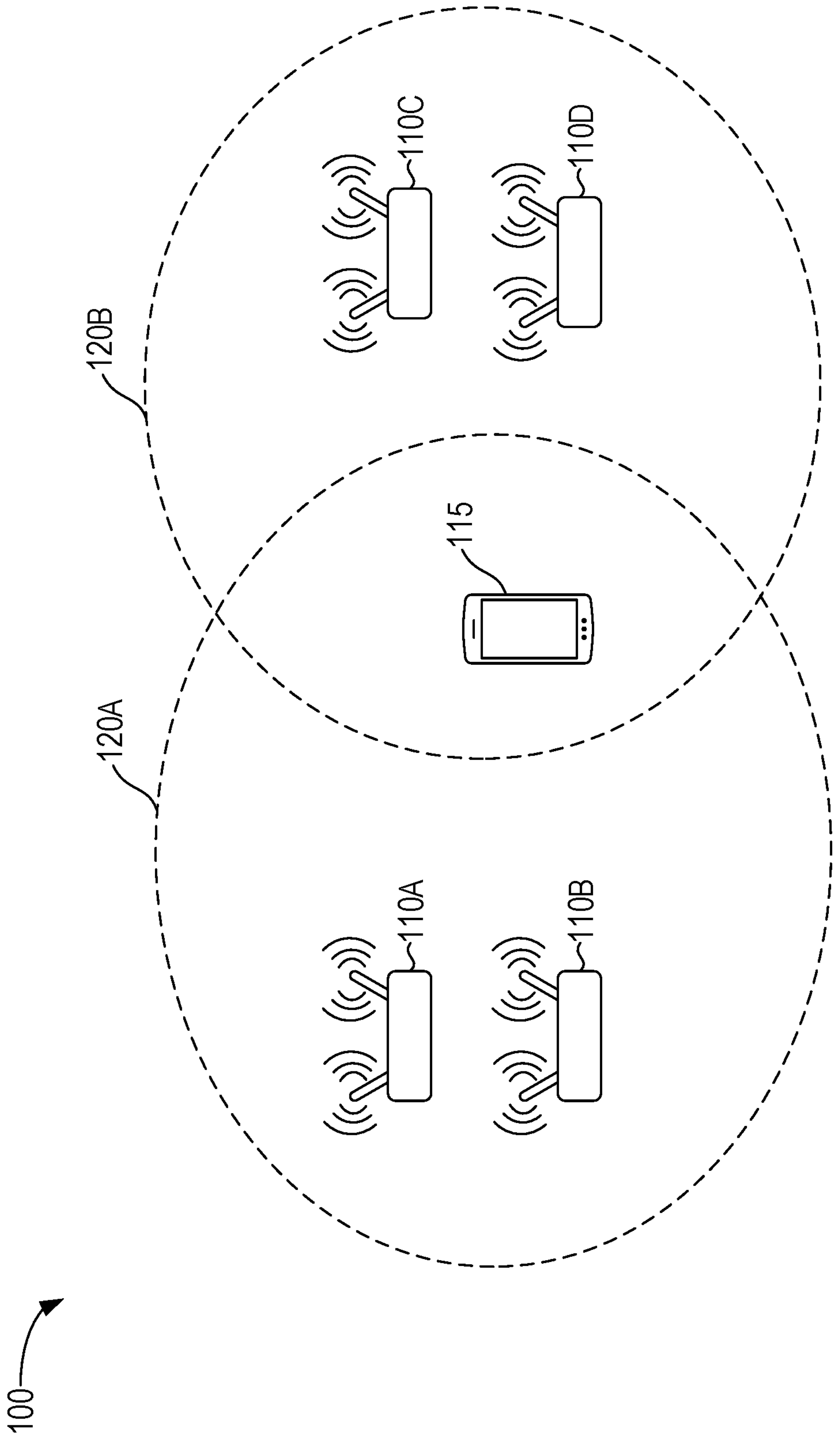
FIG. 1 depicts an example environment for use of WLAN NIDs to enhance mobility support, according to some embodiments of the present disclosure.

One embodiment presented in this disclosure provides a method, including receiving, by a client device, a first beacon from a first wireless AP, wherein the first beacon comprises a network identifier (NID) and a service set identifier (SSID); associating, by the client device, to the first wireless AP; determining, based on the NID, a set of services supported by the first wireless AP; receiving, by the client device, a second beacon from a second wireless AP, wherein the second beacon comprises the first NID; and associating, by the client device, to the second wireless AP based on determining, based on the NID, that the second wireless AP supports the set of services.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Some embodiments of the present disclosure provide a network/WLAN level identifier, referred to herein as a network identifier (NID), that is independent of the service(s) provided (e.g., voice, IOT, etc.), is not a brand/home identifier (e.g., like an SSID) and is independent of credential sets (e.g., it is not an SSID).

Although some examples discussed herein provide NIDs for WLAN systems, in some embodiments, aspects of the present disclosure are readily applicable to any communications technology where wireless devices can register/authenticate with and/or migrate between a plurality of base stations or other connection providers in a common ecosystem in which the devices rely on nor use knowledge of the services that are provided/available across base stations.

In some embodiments, the NID may be a global identifier to represent the WLAN, which can be used for roaming partner identification. In an embodiment, the NID can be used as the identifier for a set of BSSs (or APs) that provide service continuity and/or continuous coverage in that region (e.g., an enterprise campus, such as a set of office buildings for a single company). In some embodiments, the WLAN NID can be advertised to stations/client devices (e.g., identified in beacon frames transmitted to stations/clients) in a similar manner to the SSID. However, rather than identifying the service or roaming capability (associated with credentials by the connection manager), the NID identifies service continuity (e.g., indicating that all BSS identifiers (BSSIDs) that advertise the same NID are part of the same network from a WLAN resource perspective, and have a set (or bundle) of known network capabilities). That is, while an SSID may be used to identify the credentials needed to connect to the AP(s), the NID identifies service continuity between the AP(s).

In an embodiment, such capabilities associated with a given NID may include, for example, continuous coverage (e.g., allowing the client devices to roam between APs in the NID without gaps), seamless roaming (e.g., roaming to new AP/BSS without any per-BSSID or per-AP association or re-association required, such as using make-before-break roaming (MBBR), and/or WLAN-wide resource reservation capability (where WLAN resources or services can be reserved on any AP/BSS in the NID from any AP/BSS in the NID).

In some embodiments, the capabilities associated with a given NID may be known in advance. For example, during mobile device management (MDM) provisioning (e.g., when IT provisions a mobile device for use by an employee), the capabilities of one or more NIDs may be indicated to the client device using a preconfigured service list (e.g., by an IT user or administrator). Subsequently, when the client encounters the advertised NID, the client device can refer to this preconfigured list to determine the capabilities of the NID. In some embodiments, the NID capabilities can be determined or known during connection or association. For example, the client device may transmit an access network query protocol (ANQP) query to the AP to discover the NID capabilities.

In some embodiments, once NID capabilities are learned, the client device can simply look for the NID in advertised/received beacons in order to determine service/credential mapping (e.g., SSID(s) supported by the NID) as well as the network continuity/mobility capability. This dramatically simplifies the roaming process, and can allow for reduction in beacon bloat. That is, many current approaches have resulted in severe beacon bloat (e.g., by adding additional elements and data to beacons, such as to indicate capabilities, which increases the size of the beacons and consumes substantial WLAN bandwidth). In contrast, embodiments of the present disclosure enable using the NID to convey relevant information with reduced beacon size and network congestion.

In an embodiment, to approximate similar functionality using SSIDs, the client devices would be required to make the connection between advertised SSIDs and a series of corresponding capability identifiers (also advertised), making the process error-prone and inconsistent between implementations. In contrast, using a NID, the capabilities can be effectively packaged into logical groups and need not be constantly advertised or signaled in the beacons transmitted by APs in the NID.

In some embodiments, as discussed above and in more detail below, NIDs enable seamless roaming. For example, suppose two office buildings on the same campus advertise the same SSIDs (e.g., “employee” and “guest”). In some embodiments, seamless roaming may be enabled within each building by assigning each to a NID such that all APs in the first building broadcast a first NID, which is different from the NID broadcasted by APs belonging to the second building. Additionally or alternatively, seamless roaming may be enabled between the buildings (potentially with a gap in continuity) by configuring the APs in each building to all broadcast the same NID.

In an embodiment, when a client device receives a beacon indicating the same NID for a nearby AP, the client can use MBBR (e.g., no association or re-association to the new AP), while when the client roams to an AP advertising a different NID, it will use standard association procedures.

In some embodiments, as discussed above, NIDs may be publicly advertised in beacons. In some embodiments, NIDs may be private (e.g., the client may discover whether specific NID(s) are available via ANQP or directed probe/response pairs, rather than advertised in beacons). In some embodiments, private NIDs may be protected via pre-association security negotiation (PASN) or other techniques to define/indicate solution-specific capabilities privately/with enhanced security.

In some embodiments, the WLAN infrastructure may use a variety of techniques to indicate any changes or updates to NIDs (e.g., when capabilities are added or removed). For example, in some embodiments, the APs can include a change indicator in the beacon(s) or other frames, indicating which (if any) capabilities of the NID bundle have changed. In some embodiments, this indicator can comprise a bit or flag that indicates that the client device should request/retrieve the new capabilities (e.g., via ANQP), and/or may include a version value or sequence number to inform the client devices whether they have the most up-to-date capabilities list. Similarly, in some embodiments, client devices may periodically check each candidate BSSID to ensure that the same services are maintained.

Generally, by using NIDs in conjunction with SSIDs, embodiments of the present disclosure enable improved mobility support and service continuity without sacrificing or reducing the efficacy or availability of conventional WLAN characteristics. That is, by enabling APs to broadcast beacons including both NIDs and SSIDs, client devices can evaluate these NIDs and SSIDs to perform more efficient associations (including initial association as well as roaming) to the WLANs by recognizing the available capabilities and services available on each specific AP.

FIG. 1 depicts an example environment 100 for use of WLAN NIDs to enhance mobility support, according to some embodiments of the present disclosure.

In the illustrated environment, a set of wireless APs 110A-D provide one or more WLANs in a physical space. Specifically, APs 110A and 110B are associated with a first WLAN 120A and APs 110C and 110D are associated with a second WLAN 120B. For example, the first WLAN 120A (supported by APs 110A and 110B) may have a corresponding first NID. That is, the APs 110A and 110B may each include, in broadcast beacons, the NID for the WLAN 120A, while the APs 110C and 110D may each include, in broadcast beacons, a second NID for the WLAN 120B. In at least one embodiment, the WLANs 120 correspond to Wi-Fi networks.

Although the illustrated example depicts two WLANs 120 with two corresponding NIDs, in embodiments, there may be any number of WLANs/NIDs in the space. Further, though the illustrated example depicts two APs 110 supporting each WLAN 120, in embodiments, there may be any number of APs supporting any given WLAN. Additionally, though the illustrated examples depicts two WLANs 120 for conceptual clarity (each with a corresponding NID), in some embodiments, there may be multiple WLANs (e.g., multiple SSIDs) included within each NID value. For example, the APs 110A and 110B may advertise/support three different SSIDs, each within the same first NID. Similarly, the APs 110C and 110D may advertise/support two different SSIDs, each within the same second NID.

Additionally, though not included in the illustrated example, in some embodiments there may be one or more other devices or components that support the WLAN/NID infrastructure. For example, one or more wireless controllers may be used to manage the APs 110 and/or enable service continuity between APs 110 associated with the same NID.

In the illustrated environment 100, a client device 115 is depicted within the range/coverage area of the WLANs 120A and 120B. Generally, the client device 115 can correspond to any computing device capable of associating to WLANs, such as a smartphone, laptop, desktop computer, tablet, smart wearable device, IOT device, and the like. Although a single client device 115 is depicted for conceptual clarity, in embodiments, there may be any number and variety of client devices 115 in the environment. In some embodiments, the client device 115 may generically be referred to as a station (STA).

In the depicted embodiment, each AP 110 may transmit beacon frames (e.g., periodically according to a beacon interval) indicating various information about the WLAN(s) 120. As one example, APs 110A and 110B may advertise two SSIDs (e.g., an "Employee" SSID and a "Guest" SSID) and a first NID, while APs 110C and 110D advertise the same two SSIDs (e.g., an "Employee" SSID and a "Guest" SSID) with a second NID. That is, the APs 110A and 110B may transmit beacons, where each beacon indicates the first NID and further indicates either the first SSID or the second SSID. Similarly, the APs 110C and 110D may transmit beacons, where each beacon indicates the second NID, and further indicates either the first SSID or the second SSID.

In some embodiments, as discussed below in more detail, each beacon may further include a BSSID indicating the physical address/interface (e.g., the MAC address) of the AP 110 that supports the given SSID. For example, the AP 110A may advertise one set of beacons (indicating the first NID, the first SSID, and a first BSSID) as well as a second set of beacons (indicating the first NID, the second SSID, and a second BSSID). The AP 110B may similarly advertise one set of beacons (indicating the first NID, the first SSID, and a third BSSID) as well as a second set of beacons (indicating the first NID, the second SSID, and a fourth BSSID).

In some embodiments, by receiving and evaluating these beacon frames, the client device(s) 115 may determine the available services/capabilities for each AP 110 (or each BSS, as discussed above), as well as the relevant authentication/credentials for each. For example, for any given beacon, based on the advertised SSID, the client device 115 can determine the credentials/authentication needed to associate to a given BSS on a given AP 110. Further, based on the advertised NID, the client device 115 can determine the set of network services available via each BSS on each AP 110.

In some embodiments, as discussed above, the client device 115 determines the available services supported by each AP 110 by evaluating a preconfigured service list (e.g., configured or stored during device provisioning) using the advertised NID(s). In some embodiments, if the client device 115 is not aware of the specific services associated with a given NID, the client device 115 may optionally transmit a query to the AP(s) 110 (e.g., using ANQP) to determine the services. The client device 115 can then update its mappings to reflect that any APs advertising the NID support the determined/indicated services.

In this way, the client device 115 can use the NID and SSID to determine which BSS/AP 110 to associate to. Additionally, in some embodiments, the client device 115 may use the advertised NID(s) to perform enhanced roaming (e.g., without re-association). That is, when a roam is desired or occurring (e.g., because the client device 115 is nearing the edge of the coverage area for the AP 110 to which it is currently associated), the client device 115 may identify a second AP 110 advertising the same NID, and seamlessly roam to this second AP without re-association. This can substantially improve mobility support in the environment 100.

In some embodiments, as discussed above, the client device 115 can similarly utilize other services based on the NID. Additional non-limiting examples of such services may include, without limitation, broadband connectivity (e.g., Internet connectivity), computational resource usage (e.g., to offload compute needs from the client device 115), printing resources (e.g., to access printers), and the like.

In some embodiments, as discussed above, the NID enables the client device 115 to reserve and/or use such resources or services anywhere in the WLAN (e.g., on any AP 110 or other device associated with the WLAN/NID). For example, while associated to the AP 110B, the client device 115 may reserve resources or services on the AP 110A (or on a device connected to the AP 110A) because they are part of the same NID. In some embodiments, the client device 115 may then use the resources or services while associated to the AP 110A and/or during or after a (seamless) roam to the AP 110B. This service continuity, enabled by the use of NIDs, can significantly improve the operations of the client device 115 and the broader networks themselves.

Figure 2:
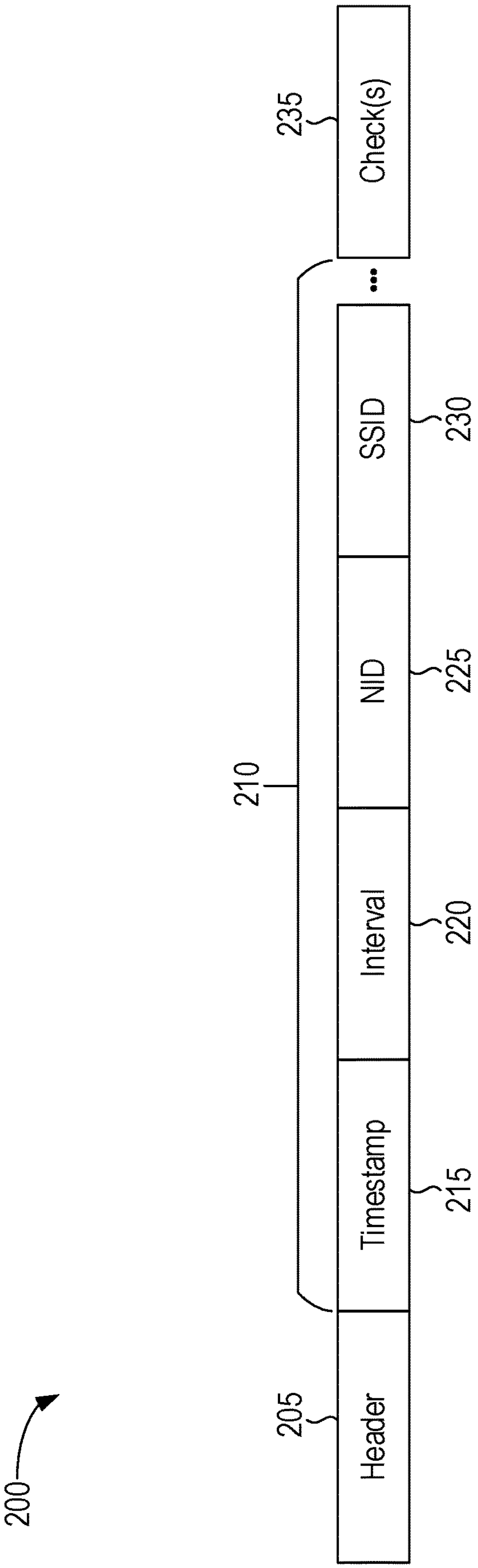
FIG. 2 depicts an example beacon frame for advertising WLAN NIDs, according to some embodiments of the present disclosure.

FIG. 2 depicts an example beacon frame 200 for advertising WLAN NIDs, according to some embodiments of the present disclosure.

In some embodiments, as discussed above, each AP (e.g., AP 110 of FIG. 1) may broadcast beacon frames, such as the beacon frame 200, according to various criteria (e.g., periodically) to advertise the WLANs (e.g., to include various network information needed or used to decide whether to connect to a given network, as well as to determine how to do so).

In the illustrated example, the beacon frame 200 includes a header 205, a body 210, and check(s) 235. In some embodiments, the header 205 may correspond to a MAC header, and may generally include any number of fields indicating the form and function of the beacon. For example, the header 205 may include or specify, without limitation, a frame control field, a protocol, destination and/or source address(es), the BSSID of the AP, and the like. In some embodiments, the checks 235 may correspond to a frame check sequence (FCS), which can be used for error detection. That is, the check(s) 235 may be computed based on the other data in the beacon frame 200 and appended to the frame, such that receiving devices can compute a similar set of bits using the frame 200, and compare the computed bits with the included checks 235 to determine whether there was an error in the frame (e.g., due to the RF medium) such that it should be discarded.

In some embodiments, the body 210 may alternatively be referred to as a payload of the beacon frame 200. The body 210 can generally include any number of fields or sections and includes information for high layers/additional context for the beacon frame 200 and/or network. For example, in the illustrated beacon frame 200, the body 210 includes a timestamp 215 (e.g., indicating the time when the beacon frame 200 was transmitted by the AP), an interval 220 (indicating the time or period between subsequent beacons), a NID 225 (indicating the NID of the AP) and an SSID 230 (indicating the SSID, as discussed above). Though not included in the illustrated example, the body 210 may optionally include other elements, such as supported data rates and other parameters.

In this way, each beacon frame 200 can advertise not only the BSSID of the physical hardware, but also the SSID (allowing the client device to determine the proper credentials) as well as the NID (allowing the client device to determine the available services).

As discussed above, though a given beacon frame 200 may advertise a single combination of BSSID, SSID, and NID, in some embodiments, each SSID may be supported by one or more BSSIDs, and each NID may support one or more SSIDs. Additionally, a given SSID may be advertised/supported by different NIDs. In this way, NIDs are used to indicate service availability/continuity, while SSIDs are used to indicate credential/authentication requirements.

Figure 3:
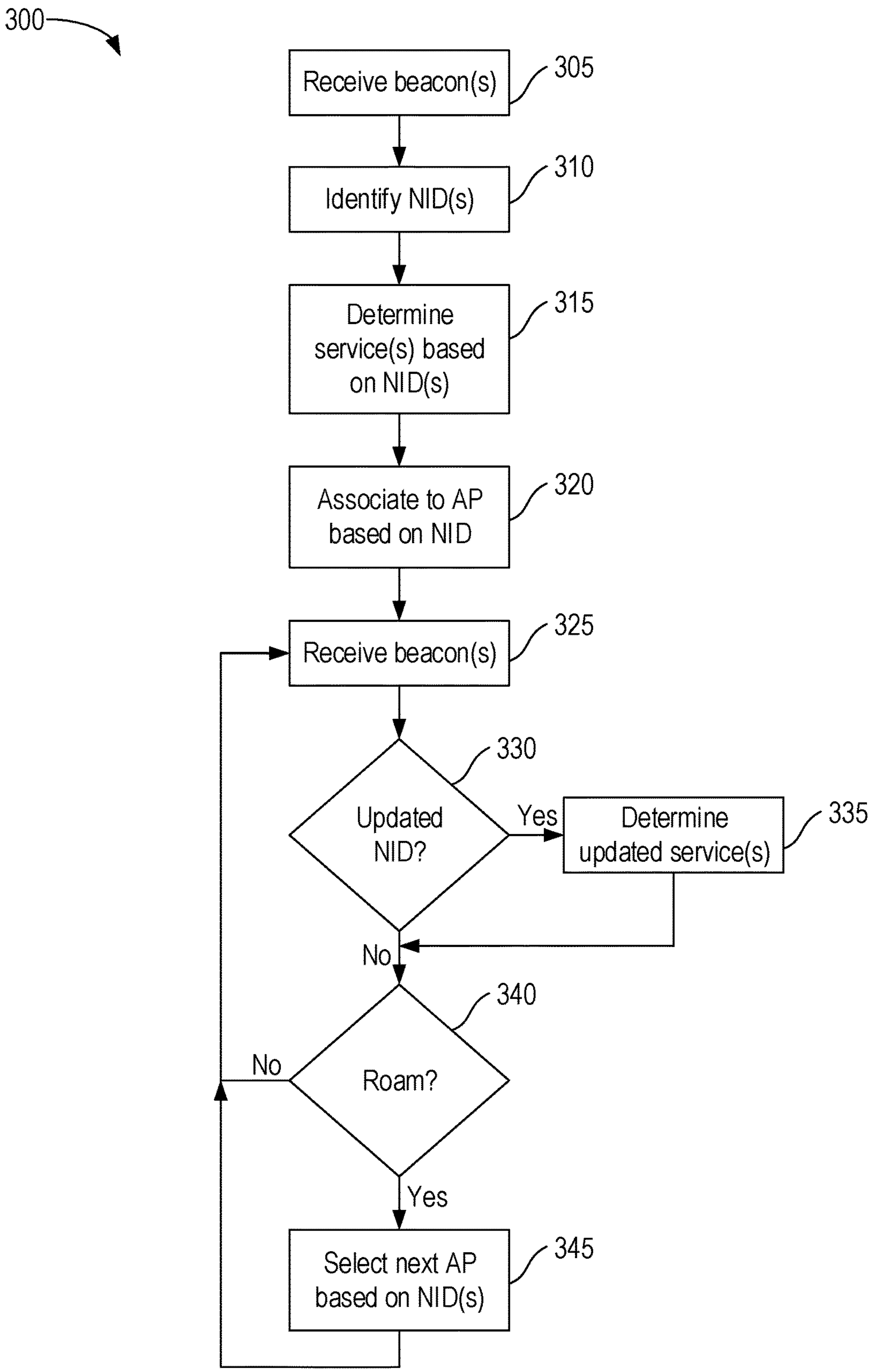
FIG. 3 is a flow diagram depicting an example method for identifying and using NIDs to selectively perform WLAN associations, according to some embodiments of the present disclosure.

FIG. 3 is a flow diagram depicting an example method 300 for identifying and using NIDs to selectively perform WLAN associations, according to some embodiments of the present disclosure. In some embodiments, the method 300 is performed by a client device, such as the client device 115 of FIG. 1.

At block 305, the client device receives one or more beacons from one or more APs. In an embodiment, one or more of the received beacons can specify a NID. In some embodiments, one or more of the beacons specify at least a NID and an SSID. In some embodiments, one or more beacons may further specify a BSSID. For example, in one embodiment, at least one of the one or more beacons may use a format such as the beacon frame 200 of FIG. 2 to specify the BSSID (e.g., in the header), the SSID, and the NID.

At block 310, the client device identifies any NID(s) reflected in the received beacon(s). That is, the client device evaluates the received beacon(s) to determine if any specify a NID, and determines the set of NID(s) that are visible/available to the client device based on the beacons.

At block 315, the client device can determine, for each identified NID in the beacon(s), a corresponding set of service(s) or capabilities provided by or associated with the respective NID. For example, in one embodiment, the client device evaluates a preconfigured mapping of NIDs to services (e.g., provided during device provisioning) to determine, for each visible NID, what service(s) are available. In some embodiments, if the client device does not have a mapping for an identified NID, the client device can query the corresponding AP(s) that advertise the NID (e.g., using ANQP) to determine the set of services.

Although the illustrated example depicts NIDs advertised in beacons (e.g., public NIDs), in some embodiments, the one or more NIDs may not be advertised (e.g., private NIDs). In one such embodiment, the client device may query the AP(s) (e.g., using ANQP) to determine whether they support or are associated with a specific (private) NID value. If so, the AP may indicate as such to the client device, allowing the client device to discover that the AP supports the NID/corresponding set of services without requiring advertisement of the NID itself.

At block 320, the client device selects and associates to an AP (from which a beacon was received) based on the advertised/determined NID and corresponding set of services associated with the selected AP. That is, the client device can select which AP to associate to based on determining that the selected AP supports or is associated with a NID that provides one or more services the client device wishes to utilize. In some embodiments, if the NID is included in the client device's mappings, the client device can thereby efficiently and quickly select and associate to an AP as soon as the NID is identified in a beacon (e.g., rather than relying on conventional ANQP or other queries to determine supported services).

At block 325, the client device can receive one or more additional beacons (e.g., from the same set of APs, or from a new set of APs). As discussed above, in some embodiments, at least one of these beacons can include a NID. In some embodiments, one or more of the beacons may be transmitted by APs that support one or more private NIDs, as discussed above.

At block 330, the client device determines whether any NIDs in its mappings have been updated, based on the received beacons. For example, as discussed above, the client device may determine whether any of the beacons include a flag or bit indicating that the services associated with the NID (advertised in the same beacon) have been updated. In some embodiments, the client device may determine a version or sequence number or value indicated in the beacon, and compare the indicated number with the version or sequence number of the NID reflected in the client device's mappings/list. If the beacon indicates an updated version number, the client device may determine that its definitions/mappings are out of date.

If, at block 330, the client device determines that one or more NID definitions have changed/been updated, the method 300 continues to block 335, where the client device determines updated service mappings for any updated NIDs. For example, for any beacons indicating an updated NID definition, the client device may determine the corresponding NID, and query an AP (e.g., the AP that transmitted the beacon), such as using ANQP, to determine the updated set of services associated with the NID. In some embodiments, as the NID indicates WLAN-wide resources and service continuity, the client device may query the AP that transmitted the beacon, or may more generally query any AP that advertises/supports the updated NID. That is, upon determining that a NID is updated (based on a beacon or other frame from a first AP), the client device may query the first AP for the updated services, or may query any other AP that also supports the updated NID.

Once the updated service(s) have been determined, the client device can update its mappings/list of NIDs. The method 300 then continues to block 340. Returning to block 330, if the client device determines that its NID definitions are up-to-date, the method 300 also continues to block 340.

At block 340, the client device determines whether to roam to a new AP. Generally, the client device may use a variety of operations and considerations to determine whether to roam, such as the signal strength or other connectivity metrics to the currently-associated AP (selected at block 320), the signal strength or other metrics offered by a neighbor or new AP (reflected in the beacons received at block 325), and the like. If the client device determines not to roam, the method 300 returns to block 325 to receive a new set of beacons.

If, at block 340, the client device determines to roam, the method 300 continues to block 345 where the client device selects a next AP to associate to based on the corresponding NID(s). That is, as discussed above, the client device may select which AP it should roam to based on which NID each AP corresponds to, allowing the client device to select an AP that supports the service(s) used by the client device. In some embodiments, the client device may select another AP advertising the same NID that the client device is currently connected to (e.g., the same NID as the AP selected in block 320). This can ensure service continuity during/after the roam, as the client device knows that all APs advertising the NID support/provide the set of services. Additionally, in some embodiments, the NID supports seamless/no-association roaming, as discussed above, reducing signal overhead and improving the efficiency of the roam.

After roaming to the new AP, the method 300 returns to block 325 to receive a new set of beacons. In this way, the client device can efficiently and accurately determine the available service continuity/mobility across WLANs based on advertised NIDs. Although not depicted in the illustrated example, in some embodiments, the client device may select the current/next AP based not only on the supported NID, but also based on the advertised/supported SSID of the AP. That is, while the client device may select an AP based at least in part on the NID (e.g., based on the desired services), the client device may also select the AP based at least in part on the SSID (e.g., based on the credentials or authorization that the client device has or wishes to use).

Figure 4:
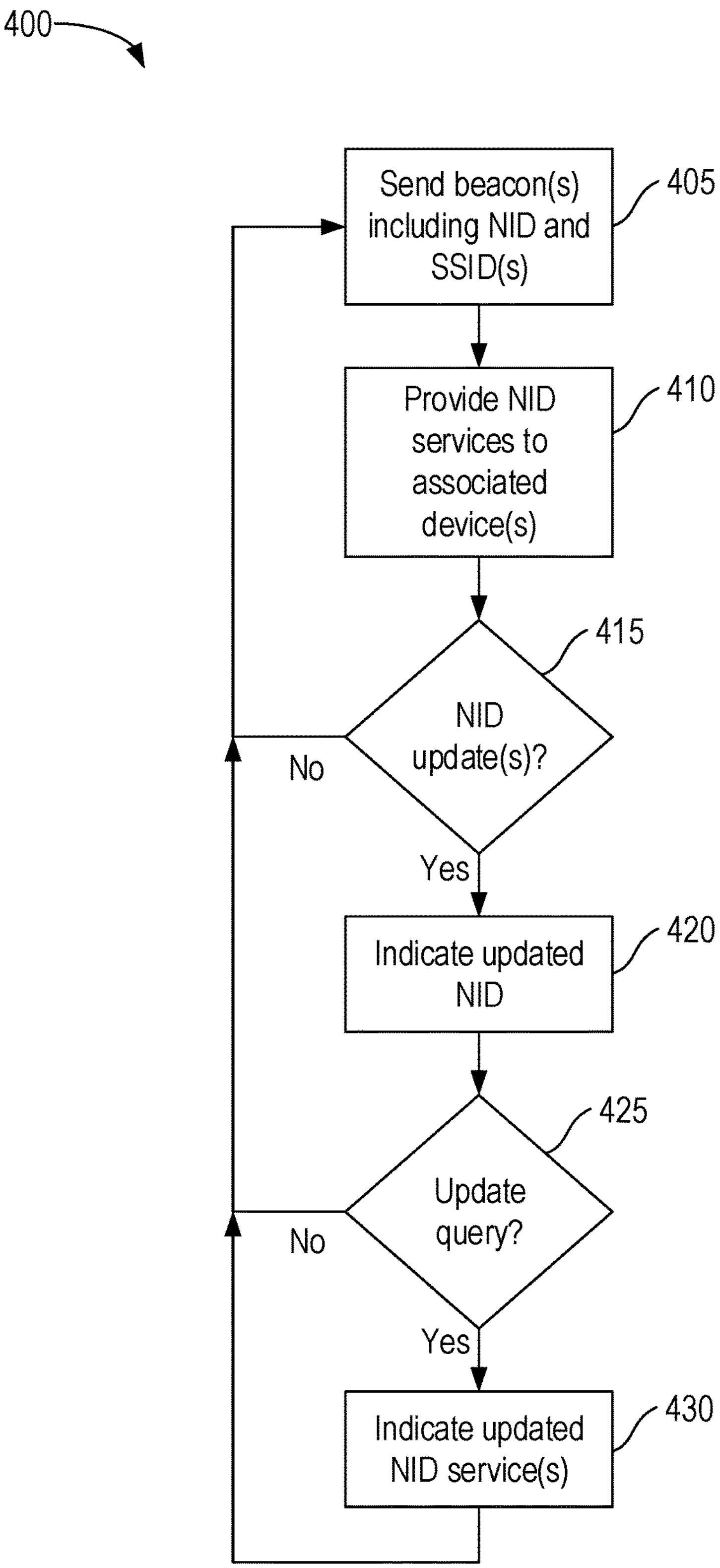
FIG. 4 is a flow diagram depicting an example method for advertising and using NIDs in WLANs, according to some embodiments of the present disclosure.

FIG. 4 is a flow diagram depicting an example method 400 for advertising and using NIDs in WLANs, according to some embodiments of the present disclosure. In some embodiments, the method 400 is performed by an AP, such as an AP 110 of FIG. 1.

At block 405, the AP sends one or more beacons indicating the NID associated with/supported by the AP, as well as the SSID(s) associated with/supported by the AP. For example, the AP may broadcast beacon(s) periodically to advertise the supported NID/SSID(s) to client devices. In some embodiments, as discussed above, the AP may support/be associated with a private NID, rather than a public NID. That is, rather than advertising the NID publicly in beacons, the AP may refrain from advertising the NID. If a client device queries the AP regarding the private NID, the AP may indicate whether it supports the indicated private NID directly to the querying client device.

At block 410, the AP provides NID services to associated device(s), as discussed above. That is, as discussed above, the AP supports/provides all services that are associated with the AP's NID. Accordingly, the AP can provide such services to any client devices associated to the AP. In some embodiments, as discussed above, the AP may also provide such services to client devices associated to any AP that is included in the NID. That is, as the NID indicates WLAN-wide resource capability/support and service continuity, the AP may provide NID services to any client in any part of the NID (associated to any AP in the NID).

At block 415, the AP determines whether the definition of its NID has been updated. For example, an administrator or wireless controller may update the NID (or indicate that the NID has been updated by another entity). If there are no NID updates, the method 400 returns to block 405 to continue advertising the NID via beacons (or to continue sending beacons without advertising a private NID, allowing clients to query the AP).

If, at block 415, the AP determines that the NID has been updated, the method 400 continues to block 420, where the AP indicates the NID updates to client device(s). For example, as discussed above, the AP may include a flag or bit in beacons or other frames transmitted or broadcast in the network. In some embodiments, as discussed above, the AP may alternatively include a sequence or version number in the beacons (or other frames) to indicate the updated NID definition.

At block 425, the AP determines whether any client devices have requested the updated NID definition (e.g., via ANQP). If not, the method 400 returns to block 405. As discussed above, in some embodiments, the client devices can generally request or determine the updated NID definition from any AP that supports the NID, and need not necessarily query the AP performing the method 400 or the AP to which the client is associated.

If, at block 425, the AP determines that one or more client devices have requested an updated NID definition, the method 400 continues to block 430, where the AP can indicate the updated set of NID services to the requesting device(s). The method 400 then returns to block 405.

In this way, the AP can provide NID services seamlessly to clients, enabling service continuity and mobility support across the entire NID. Although not depicted in the illustrated example, in some embodiments, the AP can support or provide seamless roaming between APs in the NID, as discussed above. That is, the AP may support or allow client devices to roam to the AP from other AP(s) in the NID without requiring re-association to the AP. This can further enhance the operations of the NID and devices.

Figure 5:
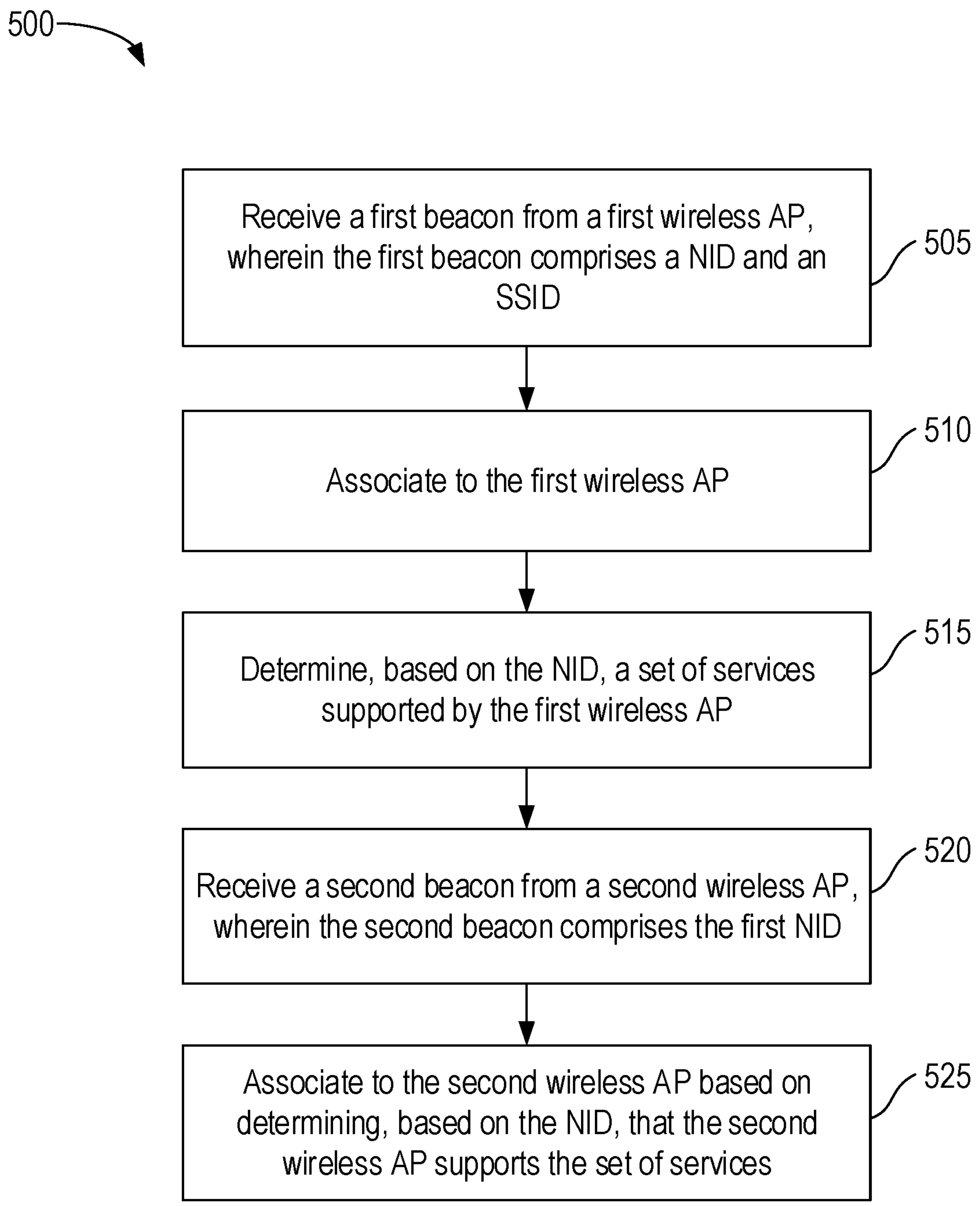
FIG. 5 is a flow diagram depicting an example method for using WLAN NIDs, according to some embodiments of the present disclosure.

FIG. 5 is a flow diagram depicting an example method 500 for using WLAN NIDs, according to some embodiments of the present disclosure. In some embodiments, the method 500 is performed by a client device, such as the client device 115 of FIG. 1.

At block 505, a first beacon (e.g., beacon frame 200 of FIG. 2) from a first wireless AP (e.g., AP 110A of FIG. 1) is received, wherein the first beacon comprises a NID (e.g., NID 225 of FIG. 2) and a SSID (e.g., SSID 230 of FIG. 2).

At block 510, a client device (e.g., client device 115 of FIG. 1) associates to the first wireless AP.

At block 515, based on the NID, a set of services supported by the first wireless AP (e.g., NID services 770 of FIG. 7) is determined.

At block 520, a second beacon from a second wireless AP (e.g., AP 110B of FIG. 1) is received, wherein the second beacon comprises the first NID.

At block 525, the client device associates to the second wireless AP based on determining, based on the NID, that the second wireless AP supports the set of services.

Figure 6:
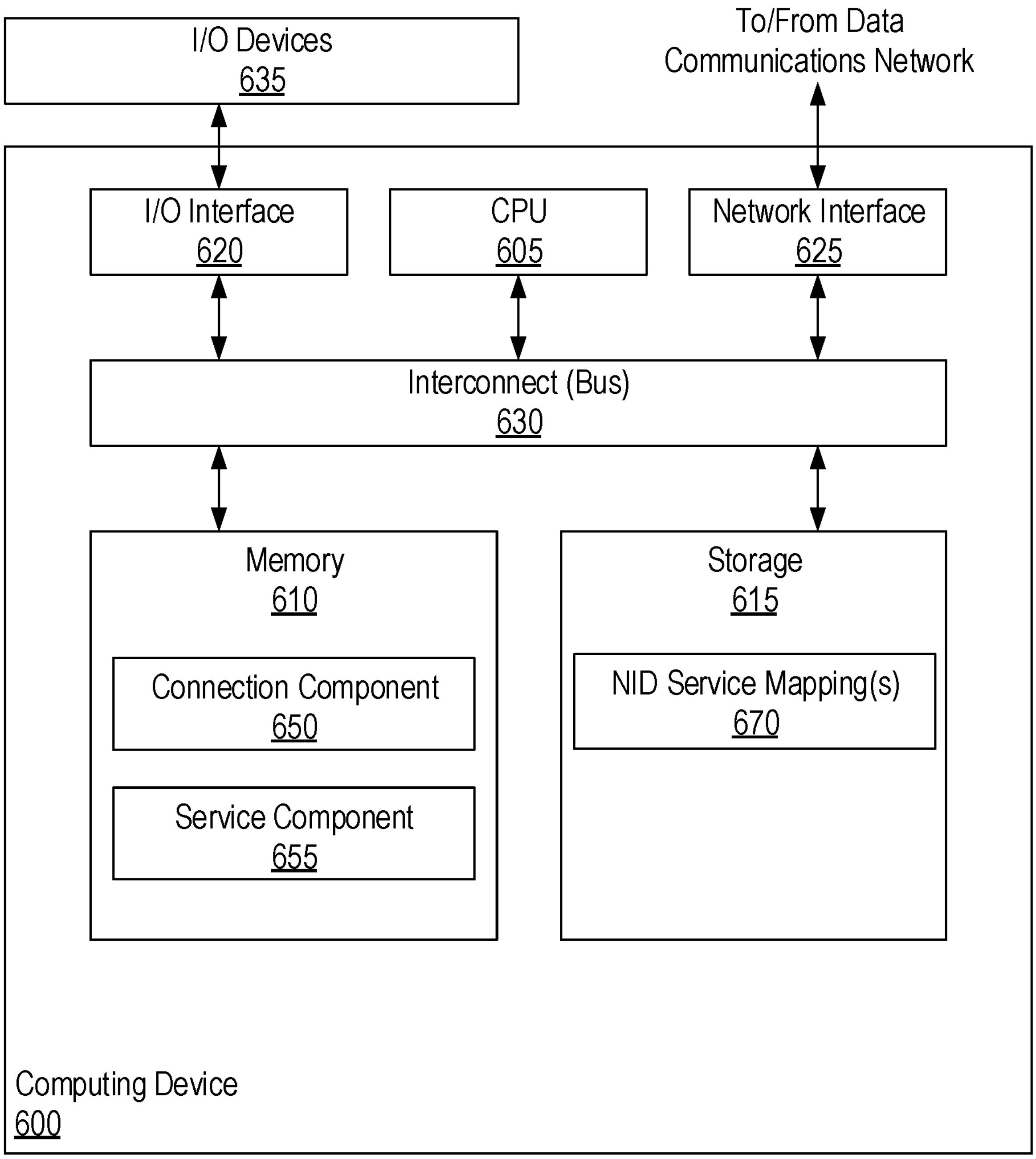
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to a client device, such as client device 115 of FIG. 1.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a connection component 650 and a service component 655, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In one embodiment, the connection component 650 may be used to receive and evaluate beacons to select AP(s) for association, as discussed above. For example, the connection component 650 may determine the NID and/or SSID advertised in a beacon in order to determine whether to associate to the corresponding AP (e.g., based on the NID service mappings 670). In some embodiments, the connection component 650 may further query the AP if needed to determine the NID service mappings (e.g., if the NID service mappings 670 are incomplete or out-of-date). In an embodiment, the connection component 650 generally facilitates or performs connection or association to the selected AP (and, in some aspects, facilitates or performs roams to other APs), as discussed above.

The service component 655 may be used to request, connect to, access, or otherwise use services provided by the NID, as discussed above. For example, after associating to an AP in a NID, the service component 655 may request and/or reserve services from the associated AP and/or from one or more other APs in the same NID.

In the illustrated example, the storage 615 includes NID service mapping(s) 670. In some embodiments, the NID service mapping(s) 670 generally indicate, for each of one or more NIDs, the corresponding service(s) or capabilities supported by the NID. In some embodiments, as discussed above, some or all of these NID service mappings 670 may be added or configured during a provisioning process for the computing device 600. In some embodiments, some or all of the NID service mappings 670 may be learned and/or updated by querying APs in the NIDs, as discussed above. Although depicted as residing in storage 615, the NID service mappings 670 may be stored in any suitable location, including memory 610.

Figure 7:
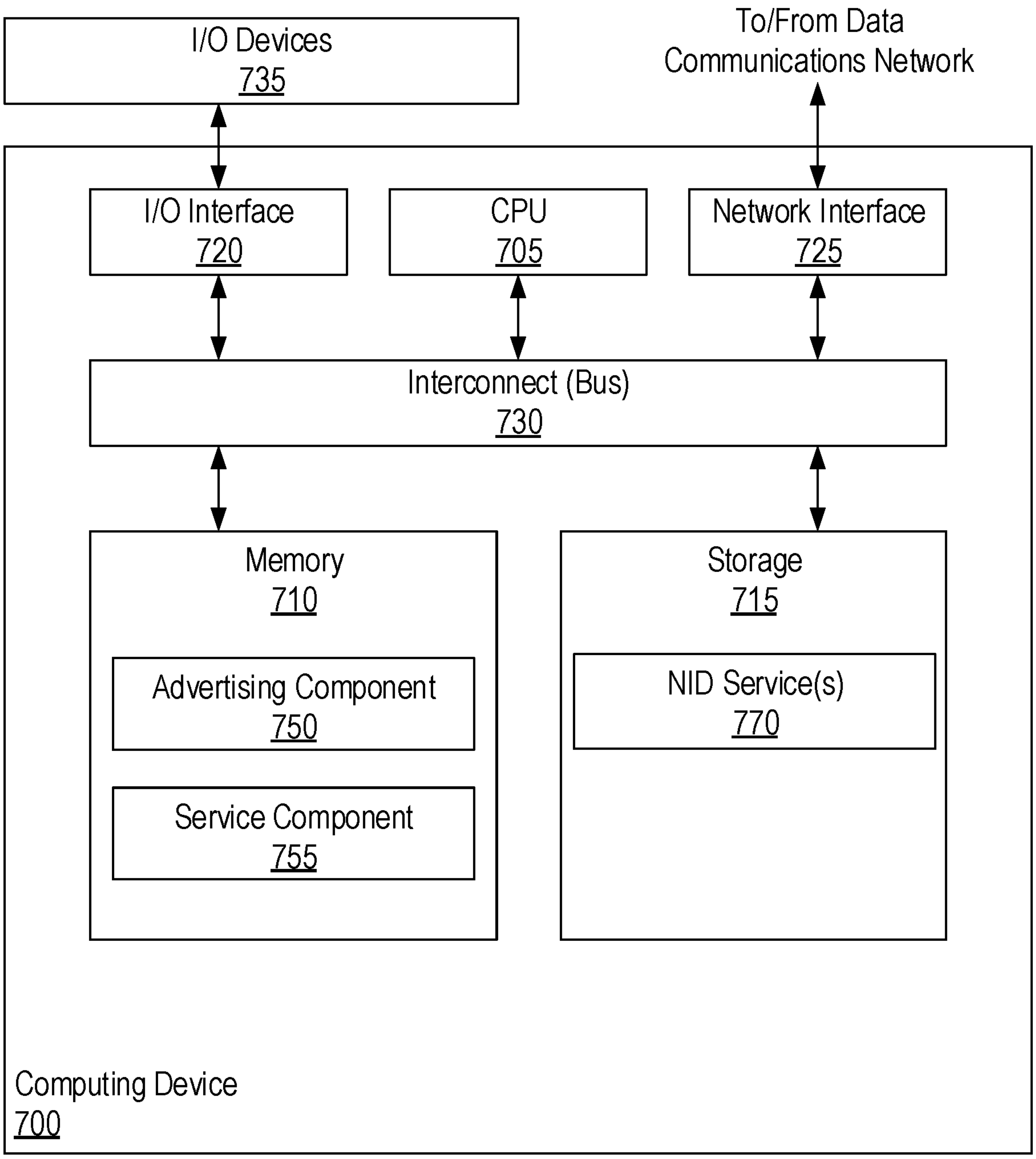
FIG. 7 depicts an example computing device configured to perform various aspects of the present disclosure, according to some embodiments of the present disclosure.

FIG. 7 depicts an example computing device 700 configured to perform various aspects of the present disclosure, according to some embodiments of the present disclosure. Although depicted as a physical device, in embodiments, the computing device 700 may be implemented using virtual device(s), and/or across a number of devices (e.g., in a cloud environment). In one embodiment, the computing device 700 corresponds to an access point, such as an AP 110 of FIG. 1.

As illustrated, the computing device 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes an advertising component 750 and a service component 755, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In one embodiment, the advertising component 750 may be used to generate and/or transmit beacons, as discussed above. For example, the advertisement component 750 may transmit beacons indicating at least a NID and one or more SSIDs. In some embodiments, the advertisement component 750 may transmit beacons without a NID (e.g., if the computing device 700 is part of a private NID). In some embodiments, the advertising component 750 may respond to client queries (e.g., requests or queries as to whether the computing device 700 supports a specified private NID).

The service component 755 may be used to provide services (or facilitate the provisioning of services) that are supported by the NID, as discussed above. For example, the service component 755 may respond to requests and/or reservations for services from associated client devices, and/or from client devices associated to other APs in the same NID.

In the illustrated example, the storage 715 includes NID service(s) 770. In some embodiments, the NID service(s) 770 generally indicate and/or correspond to the service(s) or capabilities supported by the NID. In some embodiments, some or all of these NID services 770 may reside or be provided locally by the computing device 700, or may be available on one or more other systems in the NID. That is, because the NID services 770 are WLAN-wide/shared across the devices in the NID, any given service may or may not be physically present on each specific AP or other infrastructure device. Although depicted as residing in storage 715, the NID services 770 may be stored in any suitable location, including memory 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

receiving, by a client device, a first beacon from a first wireless AP, wherein the first beacon comprises a network identifier (NID) and a service set identifier (SSID);

associating, by the client device, to the first wireless AP;

determining, based on the NID, a set of services supported by the first wireless AP using a service mapping indicating, for each respective NID of a set of NIDS, a respective set of services associated with the respective NID;

receiving, by the client device, a second beacon from a second wireless AP, wherein the second beacon comprises the NID; and associating, by the client device, to the second wireless AP in response to determining, based on the service mapping and inclusion of the NID in the second beacon, that the second wireless AP supports the set of services.

2. The method of claim 1, wherein the NID indicates service continuity such that a plurality of wireless APs advertising the NID are part of a single wireless local area network (WLAN) with shared resources.

3. The method of claim 2, wherein the set of services comprise at least one of:

(i) continuous coverage for the WLAN, (ii) seamless roaming among the plurality of wireless APs in the WLAN such that the client device can roam to each of the plurality wireless APs without a re-association request, (iii) reservation of resources on each of the plurality of wireless APs from any of the plurality of wireless APs.

4. The method of claim 1, wherein determining the set of services supported by the first wireless AP comprises transmitting, by the client device, a query for the service mapping associated with the NID.

5. The method of claim 1, wherein the service mapping, was configured on the client device during mobile device management (MDM) provisioning.

6. The method of claim 1, further comprising:

determining that a definition of the NID has changed; and determining, by the client device, an updated service mapping associated with the NID.

7. The method of claim 6, wherein determining that the definition of the NID has changed comprises identifying, in a third beacon, a flag indicating that the definition of the NID has changed.

8. The method of claim 6, wherein determining that the definition of the NID has changed comprises determining that an updated NID version value in a third beacon differs from a first NID version value in the first beacon.

9. A non-transitory computer-readable medium containing computer program code that, when executed by operation of one or more computer processors, performs an operation comprising:

receiving, by a client device, a first beacon from a first wireless AP, wherein the first beacon comprises a network identifier (NID) and a service set identifier (SSID);

associating, by the client device, to the first wireless AP;

determining, based on the NID, a set of services supported by the first wireless AP using a service mapping indicating, for each respective NID of a set of NIDS, a respective set of services associated with the respective NID;

receiving, by the client device, a second beacon from a second wireless AP, wherein the second beacon comprises the NID; and associating, by the client device, to the second wireless AP in response to determining, based on the service mapping and inclusion of the NID in the second beacon, that the second wireless AP supports the set of services.

10. The non-transitory computer-readable medium of claim 9, wherein the NID indicates service continuity such that a plurality of wireless APs advertising the NID are part of a single wireless local area network (WLAN) with shared resources.

11. The non-transitory computer-readable medium of claim 10, wherein the set of services comprise at least one of:

(i) continuous coverage for the WLAN, (ii) seamless roaming among the plurality of wireless APs in the WLAN such that the client device can roam to each of the plurality wireless APs without a re-association request, (iii) reservation of resources on each of the plurality of wireless APs from any of the plurality of wireless APs.

12. The non-transitory computer-readable medium of claim 9, wherein determining the set of services supported by the first wireless AP comprises transmitting, by the client device, a query for the service mapping associated with the NID.

13. The non-transitory computer-readable medium of claim 9, wherein the service mapping, was configured on the client device during mobile device management (MDM) provisioning.

14. The non-transitory computer-readable medium of claim 9, further comprising:

determining that a definition of the NID has changed; and determining, by the client device, an updated service mapping associated with the NID.

15. A system, comprising:

one or more computer processors; and a memory containing a program which when executed by the one or more computer processors performs an operation, the operation comprising:

receiving, by a client device, a first beacon from a first wireless AP, wherein the first beacon comprises a network identifier (NID) and a service set identifier (SSID);

associating, by the client device, to the first wireless AP;

determining, based on the NID, a set of services supported by the first wireless AP using a service mapping indicating, for each respective NID of a set of NIDS, a respective set of services associated with the respective NID;

receiving, by the client device, a second beacon from a second wireless AP, wherein the second beacon comprises the NID; and associating, by the client device, to the second wireless AP in response to determining, based on the service mapping and inclusion of the NID in the second beacon, that the second wireless AP supports the set of services.

16. The system of claim 15, wherein the NID indicates service continuity such that a plurality of wireless APs advertising the NID are part of a single wireless local area network (WLAN) with shared resources.

17. The system of claim 16, wherein the set of services comprise at least one of:

(i) continuous coverage for the WLAN, (ii) seamless roaming among the plurality of wireless APs in the WLAN such that the client device can roam to each of the plurality wireless APs without a re-association request, (iii) reservation of resources on each of the plurality of wireless APs from any of the plurality of wireless APs.

18. The system of claim 15, wherein determining the set of services supported by the first wireless AP comprises transmitting, by the client device, a query for the service mapping associated with the NID.

19. The system of claim 15, the service mapping, associated with the NID, was configured on the client device during mobile device management (MDM) provisioning.

20. The system of claim 15, further comprising:

determining that a definition of the NID has changed; and determining, by the client device, an updated service mapping associated with the NID.

* * * * *